United States Patent [19]

Marchant

[11] Patent Number: 4,539,913
[45] Date of Patent: Sep. 10, 1985

[54] WORK TABLE

[75] Inventor: John Marchant, North Narrabeen, Australia

[73] Assignee: Jeviti Pty. Limited, North Narrabeen, Australia

[21] Appl. No.: 502,623

[22] Filed: Jun. 9, 1983

[30] Foreign Application Priority Data

Jun. 10, 1982 [AU] Australia .............................. PF4377
Jun. 30, 1982 [AU] Australia .............................. PF4659
Aug. 18, 1982 [AU] Australia .............................. PF5441

[51] Int. Cl.³ .............................................. A47B 27/02
[52] U.S. Cl. ............................................. 108/7; 108/8; 108/10; 248/396
[58] Field of Search ......................... 108/4, 7, 8, 9, 10, 108/147; 248/394, 396, 422

[56] References Cited

U.S. PATENT DOCUMENTS

| | | | |
|---|---|---|---|
| 1,197,663 | 9/1916 | Putnam | 108/4 |
| 2,187,312 | 1/1940 | Goodlake | 108/7 |
| 4,440,096 | 4/1984 | Rice et al. | 108/7 X |

FOREIGN PATENT DOCUMENTS

| | | | |
|---|---|---|---|
| 3039655 | 4/1982 | Fed. Rep. of Germany | 108/7 |
| 927318 | 10/1947 | France | 108/8 |

*Primary Examiner*—William E. Lyddane
*Assistant Examiner*—Peter R. Brown
*Attorney, Agent, or Firm*—Birch, Stewart, Kolasch & Birch

[57] ABSTRACT

A work table having a support frame and a work surface operatively connected to the support frame. A first caliper linkage having a first end and a second end, the first end is operatively connected to the work surface for vertically displacing and rotating the work surface about a horizontal axis in any vertical position. A first leadscrew operatively connected to the support frame and to the second end of the first caliper for varying an included angle of the first caliper and thus the height of the connected work surface. A second caliper linkage having a first end and a second end, the first end is operatively connected to the work surface at a point displaced from the first caliper linkage for vertically displacing and rotating the work surface about a horizontal axis in any vertical direction. A second leadscrew is operatively connected to the support frame and to the second end of the second caliper for varying an included angle of the second caliper and thus the height of the connected work surface. The first and second calipers and the first and second leadscrews operatively support the work surface relative to the support frame while providing a positive drive mechanism for adjusting the orientation of the work surface relative to the support frame.

8 Claims, 5 Drawing Figures

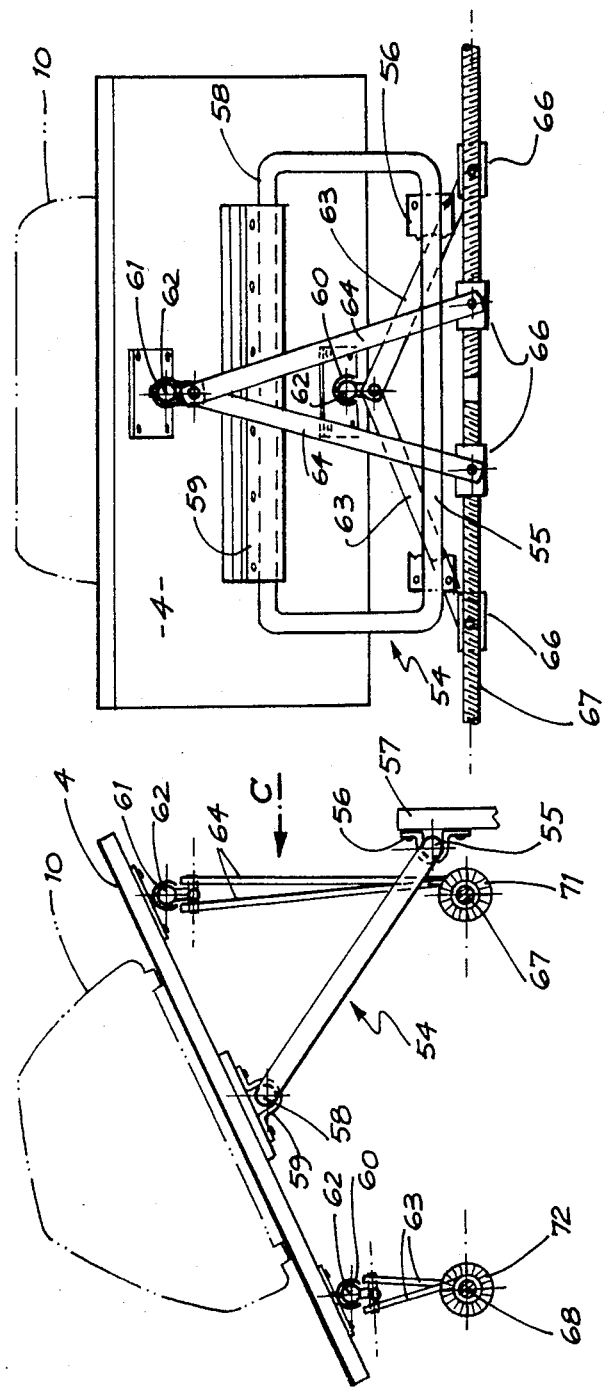

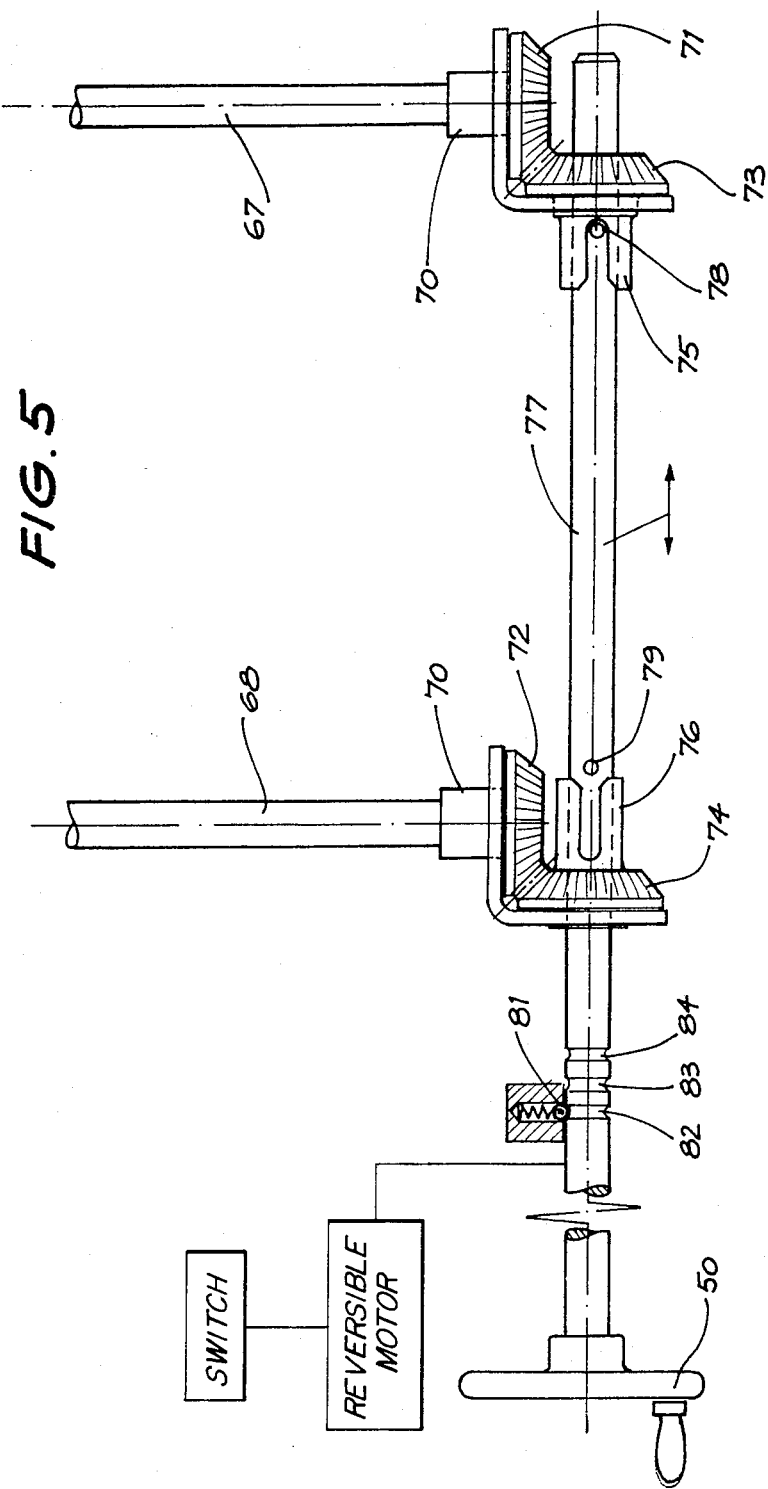

WORK TABLE

BACKGROUND OF THE INVENTION

1. Field of the Invention

This invention relates to a work table and is more specifically although not exclusively concerned with a table ergonomically designed to suit the requirements of a computer operator.

There are many areas of work which require a work table capable of being adjusted to a particular height and a particular tilt. One such area is in the computer operator field.

A computer operator may be required to work at the computer for an extended period during which instructions are typed from a keyboard into the computer, and the information is read from the computer via a display screen of a visual display unit (V.D.U.) mounted in front of the operator. The operator may also be required to make manuscript notes from time to time. The ideal work table is one which enables all these functions to be carried out in comfort.

Computer operators often have to work under artificial lighting which may produce "high lights" of reflection on the display screen. This is distracting and irritating for the operator. It is also annoying to the operator to be unable to adjust the height of the display screen to the optimum height for the operator's comfort. This will vary with the height of the operator's head which will be determined by the operator's seat height and posture.

In practice, the operator's seat is normally adjusted until the computer keyboard can be used in comfort. The keyboard is normally set in front of the display screen and a working area of the desk is provided for the operator to write on, when the computer keyboard is not being used.

DESCRIPTION OF BACKGROUND ART

Computer work tables of various designs have been proposed to satisfy one or more of the above requirements.

One such work table has hydraulically adjustable legs and a work surface of C-shape with the operator's position being at the centre of the "C". The work surface is provided with two fixed side surfaces forming the ends of the "C" and a centre surface having two independently movable sections facing the operator at the centre of the "C". Each section can be moved vertically and can also be tilted.

The section nearest the operator has the computer keyboard mounted on it, and the other section has the V.D.U. mounted on it. To use such a work table the operator selects the overall height of table to suit the fixed side surfaces of the desk, and then adjusts the height and inclination of the keyboard section so that the keyboard can be operated comfortably. Finally the remaining section is adjusted until the most comfortable working position of the display screen is obtained.

Although the above-described work table is ergonomically well designed it has certain disadvantages.

Firstly, it is necessarily large as the movable sections of the work surface cannot be used to write on. Secondly, the heights of the two movable section are only adjustable by separately adjustable finger wheels. One such finger wheel is provided beneath each corner zone of the keyboard section of the work surface and two such finger wheels are provided beneath the respective front corners of the V.D.U. work surface. The rear portion of V.D.U. work surface is supported by an upright strut of adjustable length controlled by an elongated winder rod projecting diagonally to the position of a winder handle provided adjacent the operator. The strut length is then varied by the winder to alter the inclination of the V.D.U. section. Thus the third disadvantage is the provision of eight, separately adjustable controls makes it inconvenient to change the settings of the work surfaces to suit different operators.

A second proposal of work table is described in U.S. Pat. No. 4,365,561 published on Dec. 28, 1982. This has two independently movable sections only, one for the keyboard and one for the V.D.U. The mechanism for controlling the height and inclination of the V.D.U. is complex and has to be covered by a concertina type protection or casing which prevents it from becoming inoperative through dust accumulation. The section of the table supporting the keyboard does not require such protection as its height only is adjustable, not its tilt. The work table of the United States Patent lacks versatility and is expensive to manufacture.

An object of this invention is to provide an improved work table which is capable of being cheaply manufactured and is reliable and versatile in use.

DISCLOSURE OF INVENTION

One aspect of this invention provides a work table having a work surface which is vertically displaceable and rotatable about a horizontal axis in any vertical position to which it is moved. The displacement and rotation is affected by caliper linkages arranged at each side of the axis of rotation and extending downwardly from points of attachment on the underside of the work surface. The linkages extend to separately operable leadscrews rotatable to vary the included angles of the calipers and thus the height of the parts of the work surface to which they are attached at their upper ends. Each leadscrew is positionally fixed to the worktable and supports its weight while providing part of a positive drive connection between a device for turning the leadscrew and the work surface.

An advantage of the invention is that the high gearing provided by the leadscrew prevents a heavy load placed on the worktable causing the table to tilt. Also, if the load is placed eccentrically on the table it will still be prevented from tilting as the caliper linkage is positively attached to the table and can therefore act equally as a strut or a tie of fixed but adjustable length.

In accordance with a second aspect of the invention a computer work table has a portion of its working surface for supporting a visual display unit. Such portion is both vertically displaceable and rotatable about a horizontal axis at any vertical position to which it is moved. The displacement and rotation of the portion is effected by two linkages arranged one each side of the axis of rotation of the portion, and attached at their upper ends to respective positions on the underside of the working surface. The linkages may each extend downwardly to a respective pair of spaced parallel leadscrews of identical pitch. Each leadscrew is fixed in space with respect to the work table but is rotatable to control the height of the side of the portion to which the upper end of the associated linkage is attached. Thus when the two leadscrews are rotated in synchronism, the portion displaces vertically parallel to itself but when relative rotation occurs between the leadscrews the working surface portion rotates around the hinge.

Preferably the leadscrews are provided with crown wheels which can be selectively engaged, or simultaneously engaged, with a drive shaft, such control being affected by a suitable clutch. The work table operator can then adjust the height and inclination of the work surface by suitably controlling the clutch and rotating the drive shaft.

The invention can be used to provide a work table of rugged and simple design and which can have a work surface capable of being positively held in any position to which it is moved irrespective of the magnitude or position of any load placed upon it.

BRIEF DESCRIPTION OF THE DRAWINGS

The invention will now be described in more detail, by way of example, with reference to the accompanying simplified and diagrammatic drawings, in which:

FIG. 3 is an elevation of a second portion of the work table viewed in the direction of the arrow B in FIG. 1;

FIG. 4 is an elevation of the portion of the work table shown in FIG. 3 and viewed in the direction of the arrow C in that figure; and FIG. 5 shows gearing used to alter the height and inclination of the work table portion shown in FIGS. 3 and 4.

MODES OF CARRYING OUT THE INVENTION

Figure 1:
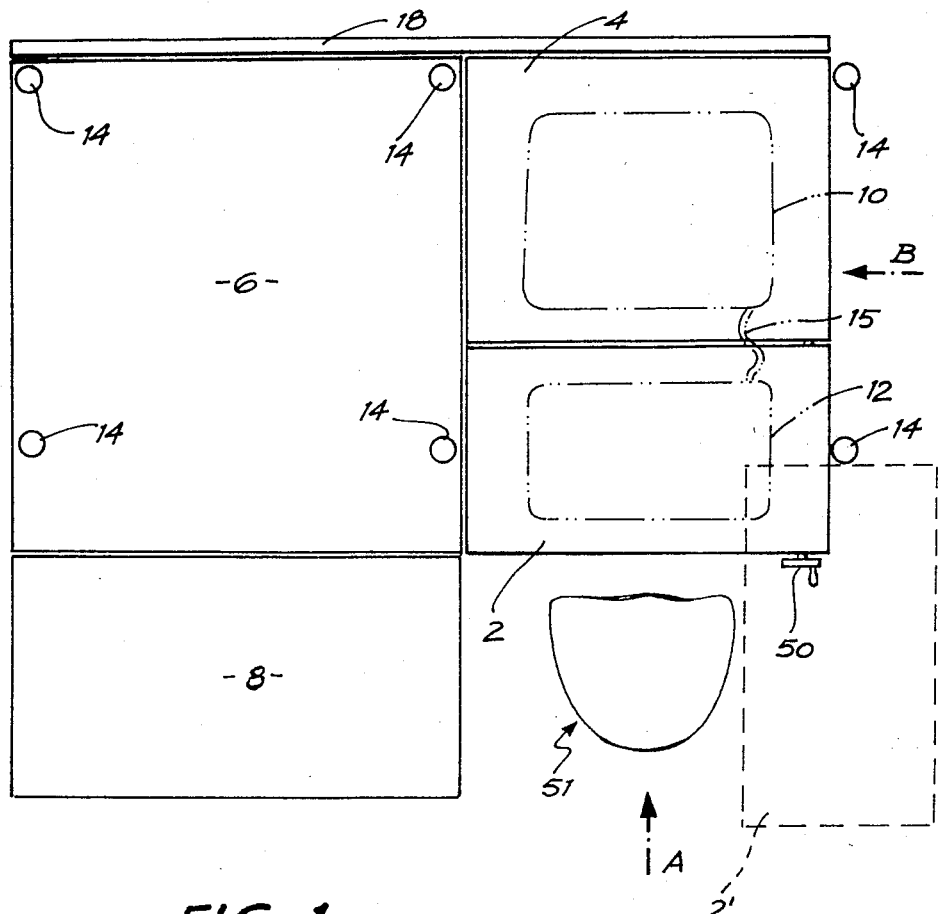
FIG. 1 is a plan view of a work table.

Referring to FIG. 1 there is shown a table formed of four top portions 2, 4, 6 and 8. Portions 2 and 4 are designed to carry a computer terminal. Portions 6 and 8 are designed as a work space, with portion 8 being slidable or hingeable beneath portion 6 in order to decrease or increase the width of the working space.

Portion 4 is of suitable dimensions to carry the display screen or V.D.U. of a computer terminal 10, as shown in FIGS. 3 and 4. This computer terminal has a separate keyboard 12 attached to the screen by a suitable electrical lead 15, the keyboard 12 being disposed on the portion 2 of the table. The table is supported on legs 14. A panel 18 is provided vertically behind the rear of the table to provide a vanity screen.

Portions 6 and 8 are disposed at the normal height of the table and are immovable in height.

Portions 2 and 4 of the table are movable in height and may both be inclined to the horizontal. In addition, portion 2 of the table may be pivoted in a horizontal plane. These freedoms of movement permit optimum use of the computer terminal. Thus the keyboard 12 may be positioned at any height and at any inclination to the horizontal and may also be pivoted to any angle within a horizontal plane. The screen 10 may be movable to any desired height and may also be pivoted so that the screen is normal to the face of the viewer or is disposed so as to avoid glare from lights, or for other ergonomic reasons.

Figure 2:
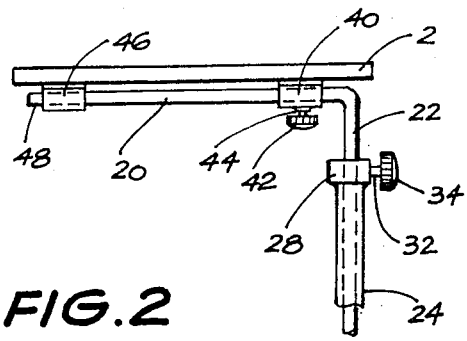
FIG. 2 is an elevation of a portion of the work table viewed in the direction of the arrow A in FIG. 1.

Referring to FIG. 2 the means for pivoting table portion 2 are shown in detail. An L-shaped rod 20 is secured by brackets 40, 46 to the underside of portion 2 while the vertical portion 22 of the L-shaped rod is disposed in a circular tubular portion 24 forming the upper portion of one leg of the table. The lower portion of the table leg contains a coil compression spring (not shown) which provides a continuous upward bias on the vertical portion 24 to counteract the weight of the pivoting table portion 2 and the keyboard 12 placed upon it. The tubular portion 24 is split at its top end and has a boss 28 which is threaded in order to carry a screw threaded bolt 32 having a knurled head 34. The head 34 can be turned to grip the vertical portion 22 in order to lock the table portion in a given height and at a desired angle in a horizontal plane. The coil compression spring in the table leg ensures that when the knurled lead 34 is released, the portion 2 does not suddenly drop. Instead its vertical position tends to remain sensibly constant as a result of the slight friction of the vertical portion 22 in the tubular portion 24 of the leg.

The bracket 40 is provided with a clamping screw 44 having a knurled head 42 and capable of being tightened to clamp the portion 2 tightly to the rod 20. When the screw 44 is released, the rod 20 provides a hinge about which the table portion 2 can be rotated to any desired inclination to the horizontal and then locked in the desired inclination by rotation of the knurled head 42. A further bracket 46 is mounted at the other end of rod portion 2 and carries a sleeve 48 which serves as a bearing for the end of rod 20.

The portion 4 of the work table is capable of being raised and lowered and turned to different angular positions at any vertical position to which it is moved by the operator who is provided with a single control handle 50 for this purpose. The handle 50 is positioned on the right-hand side of a work station 51 at which the operator's chair would normally be located so that the keyboard 12 is directly in front of the operator with the V.D.U. screen 10 behind it.

The portion 4 is guided in its vertical movement by a rectangular frame 54 of circular cross-section shown in FIGS. 3 and 4. One longer side 55 of the frame 54 is hinged at 56 to a horizontal support 57 beneath the table so that the frame can turn about the hinge. The parallel longer side 58 of the frame 54 is hinged at 59 to the underside of the centre of the portion 4 so that it can turn horizontally about a hinge also.

Two bearings 60, 61 are respectively provided beneath the portion 4 at equi-spaced positions from the hinge 59. Each bearing provides a socket for a ball 62 which is pivoted to the upper end of a caliper linkage one of which is referenced 63 while the other is referenced 64. The caliper linkages each comprise a pair of links which diverge downwardly and are pivoted at their lower ends to respective riders 66 as shown in FIG. 4.

The two riders 66 associated with each caliper are threaded onto respective end-portions of a respective one of two parallel leadscrews 67, 68. Each leadscrew has its opposite end-portions oppositely threaded so that its rotation in one direction draws the riders 66 towards one another while its rotation in the opposite direction moves the riders 66 apart.

The leadscrews are held in spaced parallel relationships in the desk frame beneath the level of the working surface by journals partly shown at 70 in FIG. 5, and are identical and lie in the same horizontal plane. The ends of the lead screws 67, 68 adjacent the right-hand side of the desk (see FIG. 1) are provided with crown wheels 71, 72 which mesh with perpendicularly arranged crown wheels 73, 74. Each of the crown wheels 73, 74 has a respective slotted collar 75, 76 through which pass a rotatable shaft 77. The slots in the collar 75, 76 open towards one another and each is associated with one of two drive pins 78, 79 fixed to the shaft 77.

The shaft 77 is axially slidable and carries the handle 50 at its end. The shaft 77 can be moved axially by the handle to three positions determined by engagement of a spring-loaded ball 81 selectively with any of three grooves 82,83,84 encircling the shaft 77. The grooves are so arranged that when groove 82 is engaged, the pin 78 engages the collar 75 to transmit rotational movement of the shaft 77 to the lead-screws 67.

Rotation of the handle 50 when the pin 78 engages the groove 82, causes the rear edge of the desk portion 10 to be raised or lowered. If the groove 83 is now engaged, by the handle 50 being pulled towards the operator, both pins 78,79 engage their respective collars 75,76. Rotation of the shaft 77 then rotates the two leadscrews 67,68 in synchronism so that the desk portion 2 moves substantially parallel to itself with negligible turning. If now the handle 50 is pulled to its third position at which the groove 84 is engaged by the ball 81, the leadscrew 68 only is rotated, and the front edge of the portion 2 can be raised or lowered by appropriate rotation of the handle 50.

From the above description it will be appreciated that the work table is robustly constructed, relatively inexpensive, and is simple to use. The operator can adjust the height and inclination of the face of the V.D.U. by turning the handle 50 and moving it axially, without leaving the seat. The operator likewise has control of the position of the keyboard 12 as the height of the desk portion 2 can be adjusted, once the knurled head 34 is released, and its inclination altered by turning it about the horizontal leg of the rod 20 once the knurled head 42 is released.

If the operator does not require to use the keyboard 12, the knurled head 34 can be released and the portion 2 turned to the position indicated in FIG. 1 in dotted outline at 2'. There is then more room in front of the operator.

Various modifications to the above-described arrangement are possible. For example, the shaft 77 can be motor driven by a reversible electric motor and the handle 50 dispensed with. The operator is then provided with a set of switches to control the motor.

It is an important feature of the invention that two parallel leadscrews are used to control the position of the portion 4 and that such leadscrews are fixed to the frame and do not displace bodily when the portion 4 is moved. This feature enables the leadscrews to be mechanically rotated in a simple, robust and effective manner by a relatively inexpensive mechanical system of gears, and to help support the weight of the work table. The function of the rectangular hinge bar 54 is to guide the vertical movement of the portion 4 to a prescribed path, and to prevent one end of the portion 4 being deflected downwardly with respect to the other if the V.D.U. is placed eccentrically on it. Thus the caliper linkages are subjected only to compressive and tensile loading and not to bending moments as these are absorbed by the hinge bar 54.

Although the invention has been specifically described with reference to a computer work table, it is capable of being applied to other forms of work surfaces or objects which are required to be adjustable in height and to be rotated at any vertical position about a hinge axis extending centrally through the object in the direction of its elongation.

The claims defining the invention are as follows:

1. A work table comprising:
    a support frame;
    a work surface operatively connected to said support frame;
    a first caliper linkage having a first end and a second end, said first end being operatively connected to said work surface for vertically displacing and rotating said work surface about a horizontal axis in any vertical position;
    a first leadscrew operatively connected to said support frame and to said second end of said first caliper for varying an included angle of the first caliper and thus the height of the connected work surface;
    a second caliper linkage having a first end and a second end, said first end being operatively connected to said work surface at a point displaced from said first caliper linkage for vertically displacing and rotating said work surface about a horizontal axis in any vertical position;
    a second leadscrew operatively connected to said support frame and to said second end of said second caliper for varying an included angle of the second caliper and thus the height of the connected work surface;
    said first and second calipers and said first and second leadscrews operatively support said work surface relative to said support frame while providing a positive drive mechanism for adjusting the orientation of said work surface relative to said support frame.

2. A work table as claimed in claim 1, in which the first and second leadscrews each carry two riders threaded on its opposite end-portions which are oppositely threaded, and the first and second linkages each comprise a caliper linkage composed of two links pivoted at their lower pair of ends to respective riders and converging upwardly to a bearing provided on the underside of the work surface.

3. A work table as claimed in claim 2, in which the first and second leadscrews have crown gears at one pair of ends respectively, and a drive shaft is provided with coupling means selectively engageable, by axial positioning of the shaft, with either or both crown gears so that the rotation of the shaft can drive both leadscrews in synchronism or selectively drive one or the other of them.

4. A work table as claimed in claim 1, in which a hinging frame provides a pair of spaced parallel hinges one of which is fixed to said support frame and the other of which is fixed to the underside of the work surface.

5. A work table as claimed in claim 1, having a second portion supported on a horizontal arm of a right-angle rod having a vertical arm telescopically slideable and clampable in an upright leg of the support frame.

6. A work table as claimed in claim 5, in which the underside of the second portion is rotatable about the horizontal arm to different angular positions and a manually operable clamp enables the second portion to be clamped in a desired angular position on the arm.

7. A work table as claimed in claim 6, in which a second clamp is provided on a longitudinally slotted, upper end-portion of the support frame and can be released to allow variations to the height and the horizontal positioning of the second portion to be made, the tightening of the second clamp causing the second portion to be locked in the position to which it is moved.

8. A work table as claimed in claim 1, provided with a reversible electric motor drive for turning the leadscrews and a switch panel for enabling the operator to control the direction of rotation of the motor and the leadscrew or leadscrews which are to be driven by it.

* * * * *